(12) United States Patent
Fujimori

(10) Patent No.: US 11,527,186 B2
(45) Date of Patent: Dec. 13, 2022

(54) IMAGE DISPLAY SYSTEM AND CONTROL METHOD FOR IMAGE DISPLAY SYSTEM

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/213,319

(22) Filed: Mar. 26, 2021

(65) Prior Publication Data
US 2021/0304653 A1 Sep. 30, 2021

(30) Foreign Application Priority Data
Mar. 26, 2020 (JP) .............................. JP2020-055570

(51) Int. Cl.
*G06F 13/14* (2006.01)
*G09G 3/20* (2006.01)
*H04N 7/08* (2006.01)
*H04N 9/31* (2006.01)

(52) U.S. Cl.
CPC ................. *G09G 3/20* (2013.01); *H04N 7/08* (2013.01); *H04N 9/3179* (2013.01); *G09G 2320/06* (2013.01); *G09G 2340/10* (2013.01); *G09G 2370/20* (2013.01)

(58) Field of Classification Search
CPC ............... G09G 5/006; G09G 2370/04; G09G 2340/10; G09G 2320/06; G09G 2370/20; G09G 2340/12; G09G 2350/00; H04N 21/41265; H04N 21/4221; H04N 21/4122; H04N 21/42208
See application file for complete search history.

(56) References Cited

U.S. PATENT DOCUMENTS

2015/0020098 A1* 1/2015 Matsuda .......... H04N 21/42222
725/37
2019/0235371 A1* 8/2019 Imai ...................... G09G 5/005

FOREIGN PATENT DOCUMENTS

JP 2018-182355 A 11/2018

* cited by examiner

*Primary Examiner* — Hau H Nguyen
(74) *Attorney, Agent, or Firm* — Dority & Manning, P.A.

(57) ABSTRACT

An image display system includes: a display device; an image supply device coupled to the display device in such a way as to be able to bidirectionally communicate and supplying an image signal; and an operation terminal having a plurality of operation buttons. The operation terminal transmits an operation signal in response to an operation on the operation button. The display device displays a first image supplied from the image supply device and a second image generated by the display device. On receiving the operation signal, the display device decides a degree of priority of the first image and the second image. The display device transmits a signal to stop updating the first image to the image supply device and executes processing based on the second image when the degree of priority of the second image is higher than the degree of priority of the first image.

7 Claims, 8 Drawing Sheets

FIG. 7A
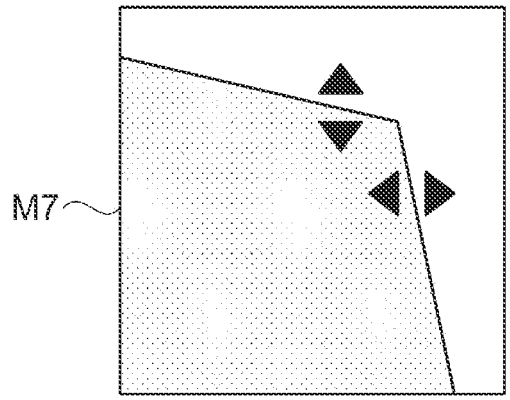
FIG. 7B
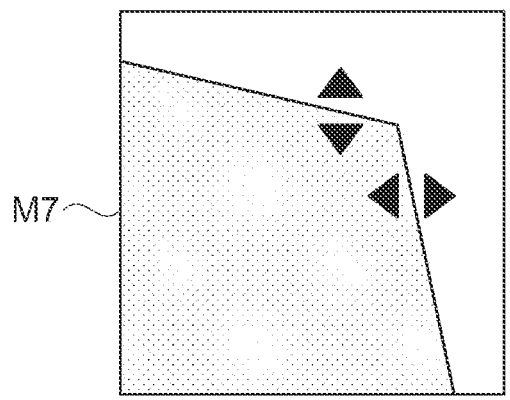 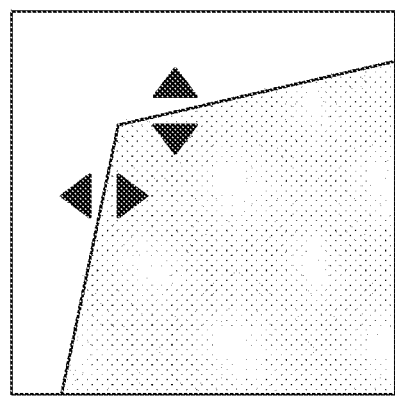

IMAGE DISPLAY SYSTEM AND CONTROL METHOD FOR IMAGE DISPLAY SYSTEM

The present application is based on, and claims priority from JP Application Serial Number 2020-055570, filed Mar. 26, 2020, the disclosure of which is hereby incorporated by reference herein in its entirety.

BACKGROUND

1. Technical Field

The present disclosure relates to an image display system and a control method for an image display system.

2. Related Art

An image display system in which a plurality of image supply devices such as DVD (Digital Versatile Disc) players or Blu-ray disc players are coupled to an image display device such as a projector is known. Such an image display system is very convenient when all the devices forming the system can be operated via a single remote controller. However, since the image display system includes a plurality of devices, there are cases where an operation not intended by a user is performed.

For example, there is a problem in that when switching between a plurality of image supply device, if the user does not intentionally stop the content played by the previous image supply device, the playback of the previous content continues before and after the switching. In view of such a problem, the present applicant has proposed the technique disclosed in JP-A-2018-182355. According to JP-A-2018-182355, when an operation to display an input source list screen is performed, the currently played content is paused. In the image display system disclosed in JP-A-2018-182355, the projector has the function of receiving an operation signal from the remote controller, and the projector controls a plurality of image supply devices.

However, JP-A-2018-182355 has room for improvement when a device with an OS (operating system) installed thereon is coupled as an image supply device. Specifically, when an image supply device such as a streaming media player with an OS installed thereon is coupled, in many cases, the image supply device has the function of receiving an operation signal from the remote controller. Therefore, a problem arises in that an inconsistent operation may be executed.

SUMMARY

An object of the present disclosure is to provide an image display system where an image supply device is coupled and where an appropriate operation is executed in response to an operation signal, and a control method for the image display system.

An image display system according to an aspect of the present disclosure includes: a display device; an image supply device coupled to the display device in such a way as to be able to bidirectionally communicate and supplying an image signal; and an operation terminal having a plurality of operation buttons. The operation terminal transmits an operation signal in response to an operation on the operation button. The display device displays a first image supplied from the image supply device and a second image generated by the display device. On receiving the operation signal, the display device decides a degree of priority of the first image and the second image. The display device transmits a signal to stop updating the first image to the image supply device and executes processing based on the second image when the degree of priority of the second image is higher than the degree of priority of the first image.

A control method for an image display system according to another aspect of the present disclosure is for an image display system including a display device, an image supply device coupled to the display device in such a way as to be able to bidirectionally communicate and supplying an image signal, and an operation terminal having a plurality of operation buttons. The control method includes: causing the operation terminal to transmit an operation signal in response to an operation on the operation button; causing the display device to display a first image supplied from the image supply device and a second image generated by the display device; causing the display device to decide a degree of priority of the first image and the second image when the display device receives the operation signal; and causing the display device to transmit a signal to stop updating the first image to the image supply device, and to execute processing based on the second image, when the degree of priority of the second image is higher than the degree of priority of the first image.

BRIEF DESCRIPTION OF THE DRAWINGS

FIG. 7A shows advanced settings of four-point keystone correction.

FIG. 7B shows advanced settings of four-point keystone correction.

DESCRIPTION OF EXEMPLARY EMBODIMENTS

Embodiment 1

Outline of Image Display System

Figure 1:
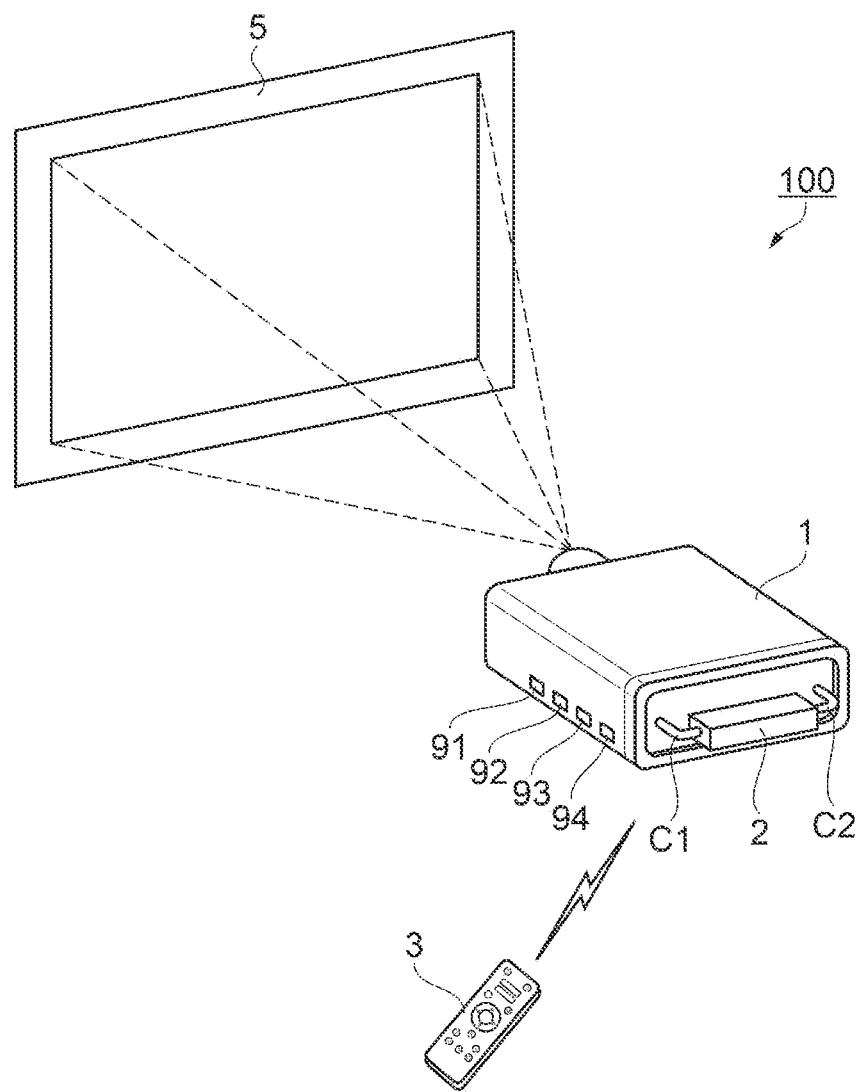
FIG. 1 shows a schematic configuration of an image display system according to Embodiment 1.

FIG. 1 shows a schematic configuration of an image display system 100 according to this embodiment.

As shown in FIG. 1, the image display system 100 is formed of a projector 1as a display device, an image supply device 2, and a remote controller 3 or the like. The projector 1 and the image supply device 2 are configured to be able to be controlled by a single remote controller 3 via a link function, described later.

The projector 1 projects and displays, on a projection surface 5, an image based on image information supplied from the image supply device 2. In this embodiment, the image supply device 2 is a small set-top box called streaming media player. The image supply device 2 is coupled to a network NW (see FIG. 2) such as the internet, receives streaming information of a content distributed by a content distribution service via the network NW, and supplies image information included in the streaming information to the projector 1. In the description below, an image based on image information supplied from the image supply device 2 to the projector 1 is also referred to as a "supplied image", and of supplied images, an image representing a content is referred to as a "content image". The image supply device 2 is not limited to a set-top box and may be any one of various image playback devices that have a control unit and can supply an image signal.

The image supply device 2 is coupled to the projector 1 via a cable C1 for supplying image information to the projector 1 and a cable C2 for receiving electric power supply from the projector 1. The electric power supply to the image supply device 2 may be in other forms than the supply from the projector 1, such as grid power. In a preferred example, the cable C1 is coupled to an HDMI (High-Definition Multimedia Interface, trademark registered) terminal. The projector 1 is also provided with a plurality of coupling terminals 91 to 94 in addition to the foregoing terminal. The coupling terminal 91 is an HDMI terminal. The coupling terminals 92 to 94 are USB (Universal Serial Bus) terminals. In this embodiment, in order to facilitate the description, one image supply device 2 is coupled. However, an external device such as a Blu-ray disc player or DVD player may be coupled to the coupling terminals 91 to 94.

The remote controller 3 is an operation terminal and has a plurality of operation buttons operated by a user. In a preferred example, the remote controller 3 has a communication function conforming to the Bluetooth (trademark registered) standard, which is a short-range wireless communication standard. However, the remote controller 3 may have an infrared communication function.

In the image display system 100, the projector 1 and the image supply device 2 are configured to be operated via the remote controller 3. The projector 1 accommodates the image supply device 2 at the back side and therefore can easily be carried and installed and can be operated via the single remote controller 3. Therefore, the projector 1 is suitable for home use where a user enjoys a content image such as a movie at home.

Schematic Configuration of Projector

Figure 2:
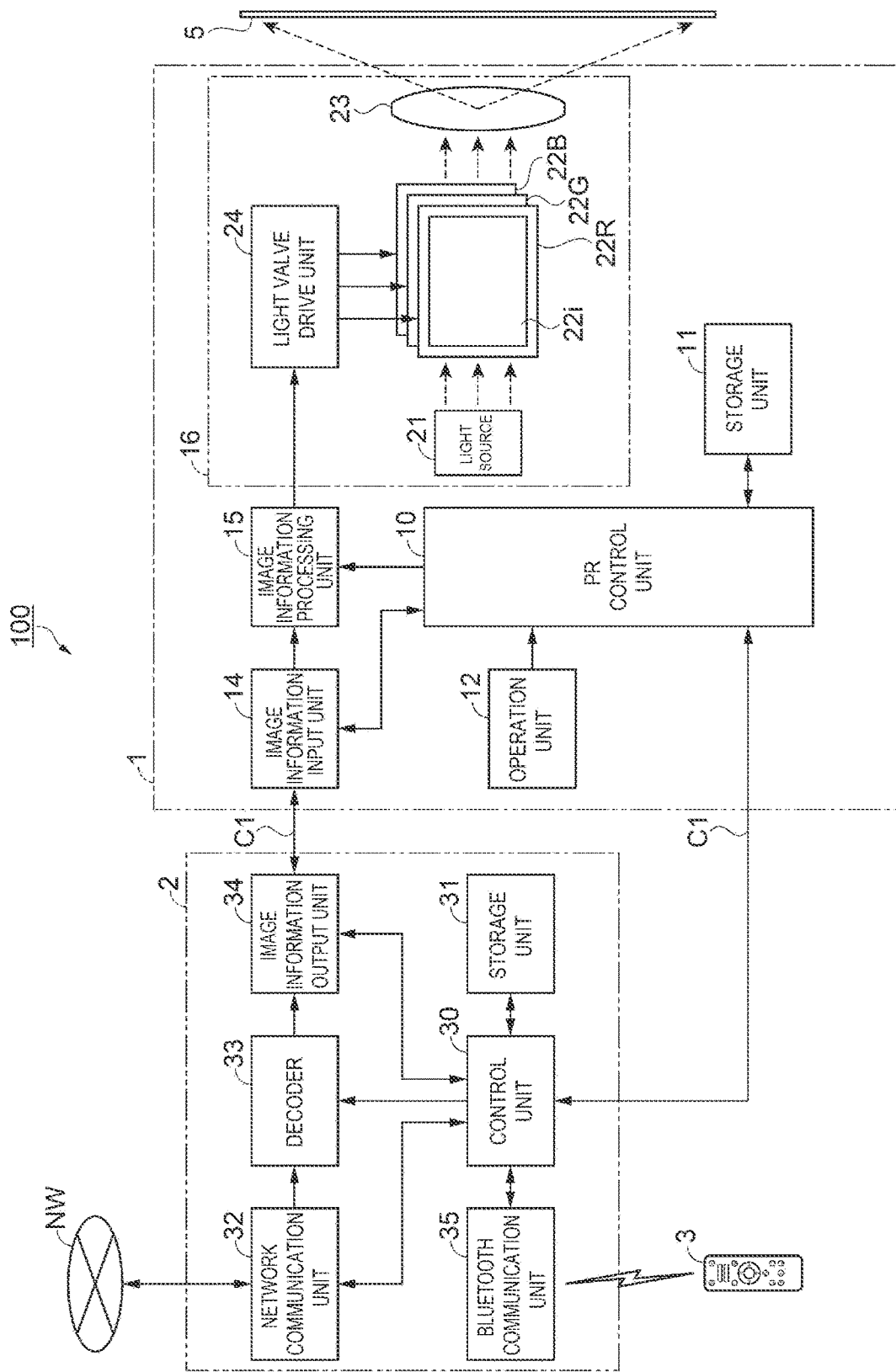
FIG. 2 is a block diagram showing the configuration of the image display system.

FIG. 2 is a block diagram showing a schematic configuration of the image display system.

As shown in FIG. 2, the projector 1 is formed of a Pr control unit 10, a storage unit 11, an operation unit 12, an image information input unit 14, an image information processing unit 15, and an image projection unit 16 as a display unit, or the like. The projector 1 also has, for example, a power-supply circuit converting grid power of AC 100 V or the like into DC power of a predetermined voltage and supplying the DC power to each part, an audio information processing unit processing audio information, and an audio output unit such as a speaker outputting a sound based on audio information, as well as the above configuration. However, these components are not illustrated in FIG. 2.

The Pr control unit 10 has one or a plurality of processors. The Pr control unit 10 operates according to a control program stored in the storage unit 11 and thus comprehensively controls the operation of the projector 1.

The storage unit 11 has a RAM (random-access memory), which is a volatile memory, and a ROM (read-only memory), which is a non-volatile memory. The RAM is used to temporarily store various data and the like. The ROM stores a control program, data and the like for controlling the operation of the projector 1. The program includes a program for deciding a degree of priority and performing processing, and accompanying data, according to the content of an operation signal transferred from the image supply device 2. The data includes an allocation table for changing the function allocated to an operation signal to a different function from a normal function when specified processing is performed.

The operation unit 12 has a plurality of operation buttons (not illustrated) for the user to give various instructions to the projector 1. The operation buttons provided at the operation unit 12 include a power button for switching on and off the power supply, a menu button for displaying an operation menu image, a direction button used to select an item or the like in a menu image, a decision button for finalizing a selected item, and the like. When the user operates the various operation buttons of the operation unit 12, the operation unit 12 outputs an operation signal corresponding to the content of the operation by the user to the Pr control unit 10.

The projector 1 may have a remote control receiving unit. When a remote controller transmitting an infrared operation signal is used, the projector 1 has an infrared signal receiving unit.

The image information input unit 14 has a plurality of coupling terminals and an interface circuit or the like. The plurality of coupling terminals are HDMI terminals and USB terminals, as described with reference to FIG. 1. The image supply device 2 is coupled to the cable C1 coupled to the HDMI terminal.

The projector 1 and the image supply device 2 are coupled in such a way as to be able to bidirectionally communicate mutual control signals, via the CEC (Consumer Electronics Control) function of HDMI. In other words, the projector 1 and the image supply device 2 are set in such a way that a link function that enables the single remote controller 3 to control both the projector 1 and the image supply device 2 can be used via the HDMI coupling.

The image information processing unit 15, under the control of the Pr control unit 10, performs various kinds of processing on image information inputted from the image information input unit 14 and outputs the processed image information to a light valve drive unit 24 of the image projection unit 16. For example, the image information processing unit 15 executes processing of adjusting image quality such as brightness and contrast, and processing of superimposing an OSD (on-screen display) image such as a menu image or various messages on a part or the entirety of a supplied image, or the like, according to need. The image information processing unit 15 may be formed of one or a plurality of processors or may be formed of a dedicated processing device such as an ASIC (application-specific integrated circuit) or FPGA (field-programmable gate array).

The image projection unit 16 has a light source 21, three liquid crystal light valves 22R, 22G, 22B as light modulation device, a projection system 23, a light valve drive unit 24, and the like. The image projection unit 16 modulates light emitted from the light source 21 and forms image light via the liquid crystal light valves 22R, 22G, 22B, projects the image light from the projection system 23 formed of a projection lens and the like, and thus displays an image on the projection surface 5.

The light source 21 includes a discharge-type light source lamp such as an ultra-high-pressure mercury lamp or metal halide lamp, or a solid-state light source such as a light-emitting diode or semiconductor laser. The light emitted from the light source 21 is converted into light having substantially uniform luminance distribution by an optical integration system, not illustrated, and is separated into color light components of red, green, and blue, which are the primary colors of light, by a color separation system, not illustrated. Subsequently, the color light components become incident on the liquid crystal light valves 22R, 22G, 22B, respectively.

Each of the liquid crystal light valves 22R, 22G, 22B is formed of a transmission-type liquid crystal panel having a pair of transparent substrates with a liquid crystal contained between them, or the like. In each liquid crystal panel, a rectangular image forming area 22$i$ formed of a plurality of pixels arranged in a matrix is formed. A drive voltage can be applied to the liquid crystal at each pixel.

The light valve drive unit 24 forms an image in the image forming area 22$i$ in the liquid crystal light valves 22R, 22G, 22B. Specifically, the light valve drive unit 24 applies a drive voltage corresponding to image information inputted from the image information processing unit 15, to each pixel in the image forming area 22$i$, and thus sets each pixel to the light transmittance corresponding to the image information. The light emitted from the light source 21 is modulated for each pixel by being transmitted through the image forming area 22$i$ in the liquid crystal light valves 22R, 22G, 22B. Thus, image light corresponding to the image information is formed for each color light. The image light of the respective colors, thus formed, is combined for each pixel into image light representing a color image by a light combining system, not illustrated. The resulting image light is projected in an enlarged form onto the projection surface 5 by the projection system 23. Thus, an image corresponding to the image information inputted from the image information processing unit 15 is displayed on the projection surface 5.

Schematic Configuration of Image Supply Device

The image supply device 2 is formed of a control unit 30, a storage unit 31, a network communication unit 32, a decoder 33, an image information output unit 34, a Bluetooth communication unit 35, and the like.

The control unit 30 has one or a plurality of processors. The control unit 30 operates according to a control program stored in the storage unit 31 and thus comprehensively controls the operation of the image supply device 2. The storage unit 31 includes a RAM and a ROM. The RAM is used to temporarily store various data and the like. The ROM stores a control program, data and the like for controlling the operation of the image supply device 2. The control program includes a program including processing of transferring an operation signal from the remote controller 3 to the projector 1 according to the content of the operation signal, and then following an instruction from the projector 1.

The network communication unit 32 is coupled to the network NW via a wire or wirelessly and transmits and receives information to and from an external device coupled to the same network NW. The network communication unit 32 in this embodiment receives streaming information distributed from a streaming server of a content distribution service and outputs the received streaming information to the decoder 33.

The decoder 33 decodes the streaming information inputted from the network communication unit 32 and thus converts the streaming information into image information in a format that can be used in the projector 1. The decoder 33 in this embodiment decodes the streaming information and thus generates image information conforming to the HDMI standard.

The image information output unit 34 has an HDMI terminal and is coupled to the image information input unit 14 of the projector 1 via the cable C1 coupled to this terminal. The image information output unit 34 outputs the image information generated by the decoder 33 to the image information input unit 14 of the projector 1. Also, as described above, the image information output unit 34 relays input and output of a control signal via the CEC function of HDMI. Therefore, the control unit 30 can transmit and receive a control signal to and from the Pr control unit 10 of the projector 1 via the image information output unit 34. In FIG. 2, an arrow line indicating the exchange of data between the control unit 30 and the Pr control unit 10 of the projector 1 is drawn between these units for the sake of convenience of the drawing. However, in practice, a control signal including an operation signal is transmitted and received via the cable C1.

The Bluetooth communication unit 35 has a communication device conforming to Bluetooth and performs wireless communication in conformity with Bluetooth, using radio waves in the 2.4 GHz band. The Bluetooth communication unit 35 receives and decodes an operation signal of Bluetooth transmitted from the remote controller 3 and transmits the operation signal to the control unit 30.

Schematic Configuration of Remote Controller

Figure 3:
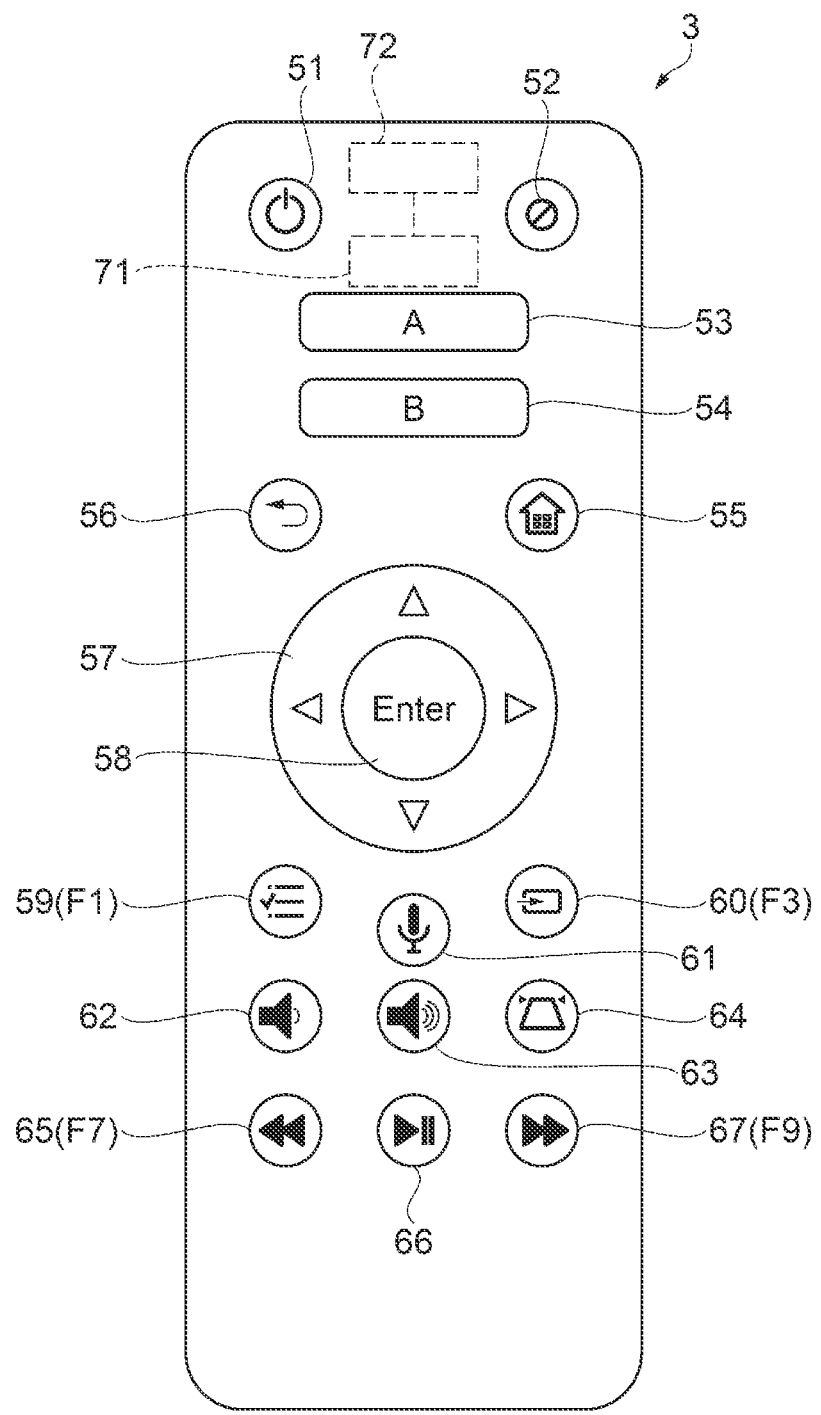
FIG. 3 shows a schematic configuration of a remote controller.

FIG. 3 is a plan view showing a schematic configuration of the remote controller 3.

As shown in FIG. 3, the remote controller 3 is formed of a control unit 71, a Bluetooth communication unit 72, a plurality of operation buttons, and the like.

The control unit 71 has one or a plurality of processors, and a memory such as a RAM or ROM. The control unit 71 operates according to a control program stored in the memory and thus comprehensively controls the operation of the remote controller 3.

The Bluetooth communication unit 72 as a receiving unit has a communication device conforming to Bluetooth and wirelessly communicates with the image supply device 2 in conformity with Bluetooth. Specifically, the Bluetooth communication unit 72, under the control of the control unit 71, encodes an operation signal corresponding to an input operation on an operation button and transmits the operation signal of Bluetooth to the image supply device 2.

As the plurality of operation buttons, a power button 51, a mute button 52, content selection buttons 53, 54, a home button 55, a back button 56, a direction key 57, an enter button 58, a menu button 59, a source selection button 60, a speech recognition button 61, a sound volume down button 62, a sound volume up button 63, a keystone correction button 64, a rewind button 65, a play button 66, and a fast-forward button 67 are provided.

The power button 51 is an operation key for switching on and off the power of the projector 1 and the image supply device 2.

The mute button 52 is an operation button for stopping sound.

The content selection button 53 is a selection button for selecting a content distribution service. A predetermined specific video distribution service is allocated to the content selection button 53. The content selection button 54 is similarly configured. A different video distribution service from the content selection button 53 is allocated to the content selection button 54.

The home button 55 is an operation key for displaying a home screen of the image supply device 2. The back button 56 is an operation key for returning to the state before the immediately previous operation is performed. The direction key 57 is a cross key used to select an item to be executed from a menu screen, or the like.

The enter button 58 is an operation key used to finalize the item selected with the direction key 57, or the like.

Figure 5:
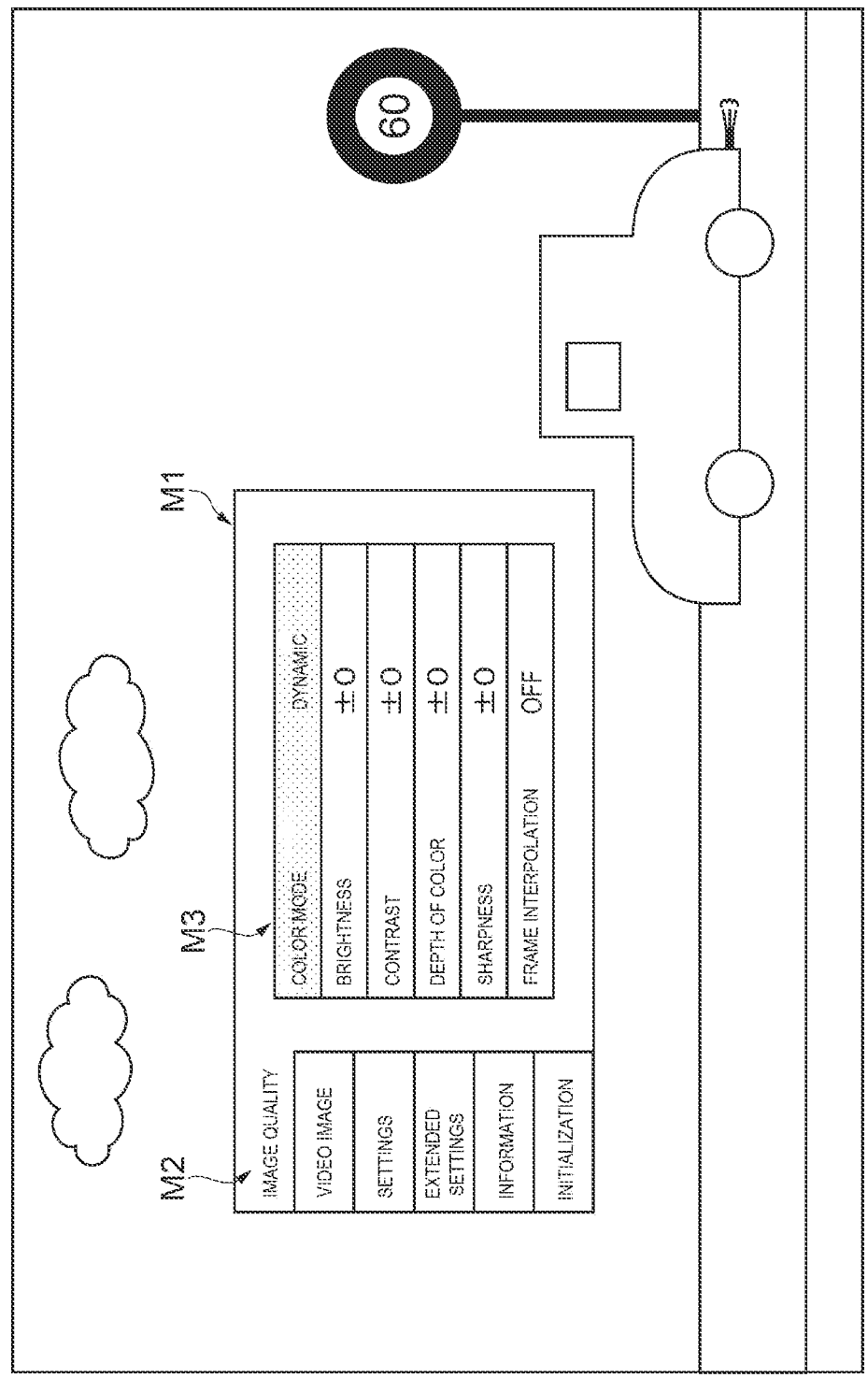
FIG. 5 shows an example of a projection image.

The menu button 59 is an operation key for displaying a menu screen for selecting a plurality of setting items when setting the projector 1. A menu screen M1 shown in FIG. 5 is an example of the menu screen.

The source selection button 60 is an operation key for displaying a list of selectable external devices when selecting a supply source and is used to switch between external devices coupled to the projector 1, or the like.

The speech recognition button 61 is an operation key used when a voice search function of the image supply device 2 is used.

The sound volume down button 62 and the sound volume up button 63 are operation keys used to adjust the sound volume.

The keystone correction button 64 is an operation key used to perform keystone correction in order to adjust the shape of a projection image by the projector 1. Keystone correction can be selected from the menu screen. However, a press on the keystone correction button 64 directly activates four-point keystone correction.

The rewind button 65, the play button 66, and the fast-forward button 67 are operation keys used to rewind, play back, and fast-forward an image.

Example of Deciding Degree of Priority of Event Processing

Figure 4:
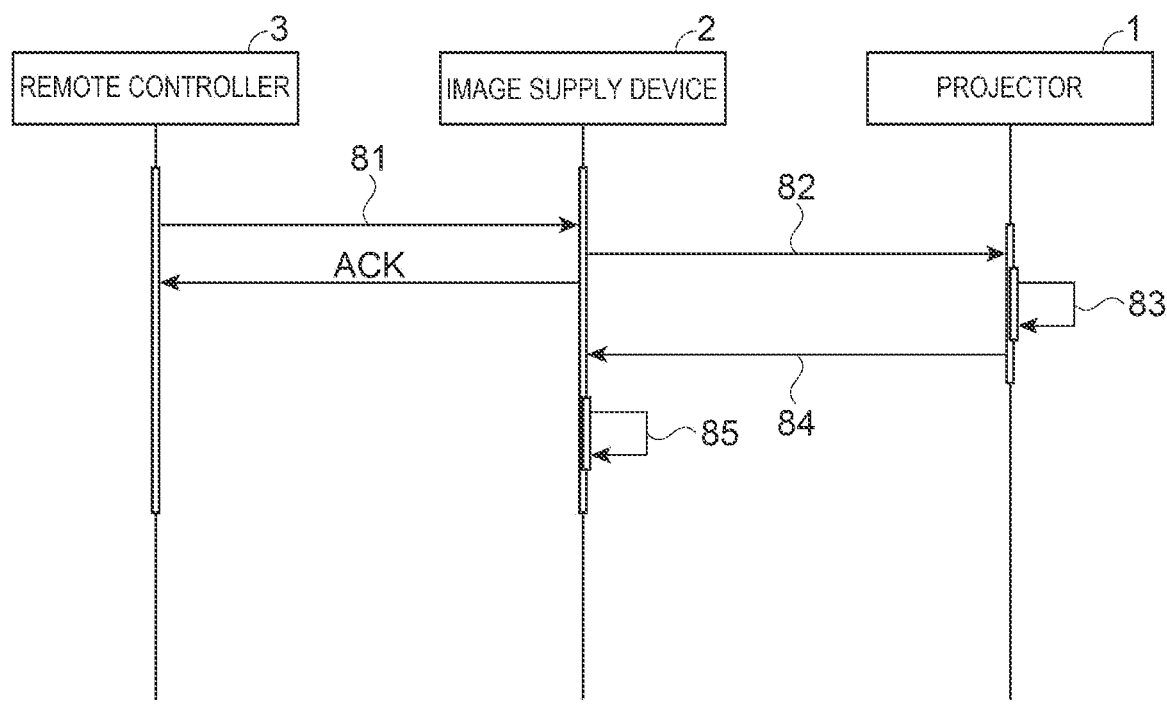
FIG. 4 is a sequence chart showing a flow of processing of an operation signal.

FIG. 4 is a sequence chart showing the exchange of an operation signal on the occurrence of an event. FIG. 5 shows an example of a projection image on the occurrence of an event.

As described above, in the image display system 100, the projector 1 and the image supply device 2 are configured to be operated via the single remote controller 3. Since the image supply device 2 has the function of receiving an operation signal from the remote controller 3, when an event involving both the projector 1 and the image supply device 2 occurs, the image display system 100 needs to decide the degree of priority and process the event accordingly. A specific example will now be described.

FIG. 4 shows the exchange of an operation signal and a control signal executed when the user adjusts the color mode, as an example of the event. In FIG. 4, the remote controller 3, the image supply device 2, and the projector 1 are objects.

In the initial state, the projector 1 plays back a video based on a content image from the image supply device 2. This video is equivalent to a first image supplied from the image supply device 2.

First, the user operates the menu button 59 on the remote controller 3. This causes the remote controller 3 to transmit an operation signal to display a menu screen to the image supply device 2, in processing 81.

On receiving the operation signal, the image supply device 2 in processing 82 transfers the operation signal to the projector 1 and waits for an instruction from the projector 1.

On receiving the operation signal, the projector 1 executes the following processing according to the content of the operation signal. Since the menu screen is an event relating to the setting of the projector 1, the projector 1 displays the menu screen in processing 83 and transmits a control signal to pause the video based on the content image to the image supply device 2 in processing 84. That is, the degree of priority of the menu screen relating to the setting of the projector 1 is made higher than that of the video based on the content image. The menu screen is equivalent to a second image generated by the projector 1. The control signal in the processing 84 is equivalent to a response corresponding to the operation signal transferred from the image supply device 2.

On receiving the control signal in the processing 84, the image supply device 2 in processing 85 pauses the video based on the content image and stops update of the video. The processing 85 is equivalent to executing processing represented by the response from the projector 1. FIG. 5 shows a projection image in this state. A menu screen M1 is displayed as an OSD (on-screen display) image in the paused image.

On the left side of the menu screen M1, setting items for the projector 1 are arranged, that is, from top to bottom, image quality, video image, settings, extended settings, information, and initialization. The state where image quality M2 is selected by default is shown. As adjustment items for the image quality M2, color mode, brightness, contrast, depth of color, sharpness, and frame interpolation are arranged from top to bottom. The state where color mode setting M3 is selected by default is shown. The currently set color mode setting M3 is a dynamic mode.

In this state, to adjust the color mode, the user presses the enter button 58 on the remote controller 3. This changes the screen to a color mode setting screen, where the user can select other color modes such as presentation or cinema. At this point, since the background video is paused, the background image serving as a reference for comparison when switching the color mode does not change except in color tone. Therefore, the user can select a color mode of a desired color tone and set to switch to this color mode.

When the user has decided the color mode and has ended the color mode adjustment, the color mode setting screen ends and the update of the video based on the content image from the image supply device 2 is resumed. Specifically, when the color mode adjustment processing as the second image ends in the state where the update of the video based on the content image as the first image is stopped, the projector 1 transmits a signal to resume the update of the video based on the content image, to the image supply device 2.

In this embodiment, in a preferred example, when the menu button 59 is pressed as an operation relating to the setting of the projector 1, the image supply device 2 transfers the operation signal to the projector 1 and waits for an instruction from the projector 1. When the keystone correction button 64, the source selection button 60 or the power button 51 is pressed as an operation relating to the setting of the projector 1, preferably, an instruction from the projector 1 may be similarly sought.

However, the above configuration is not limiting. It suffices that the image display system 100 can decide the degree of priority on the occurrence of an event involving the projector 1 and the image supply device 2. For example, an instruction from the projector 1 may be sought with respect to not only a specified operation but also all operations.

As described above, when the menu button 59 is operated, the remote controller 3 transmits an operation signal according to the operation on the menu button 59, and the projector 1 displays a video based on a content image as the first image supplied by the image supply device 2 and the menu screen M1 as the second image generated by the projector 1. On receiving the operation signal, the projector 1 decides the degree of priority of the video and the menu screen M1. When the degree of priority of the menu screen M1 is higher, the projector 1 transmits a signal to stop updating the video to the image supply device 2 and executes processing based on the menu screen M1. Therefore, the image display system 100 in which an appropriate operation is executed according to an operation signal, and a control method for this system, are provided.

The image supply device 2 has the Bluetooth communication unit 35 as the receiving unit receiving an operation signal from the remote controller 3. On receiving the operation signal, the image supply device 2 transfers the operation signal to the projector 1 according to the content of the operation signal and follows an instruction from the projector 1. Therefore, even when an event involving both the projector 1 and the image supply device 2 occurs, the image display system 100 can decide the degree of priority and process the event accordingly.

Another Example of Deciding Degree of Priority of Event Processing—1

In the above embodiment, the case where the menu screen M1 as the second image has a higher degree of priority than the video based on the content image as the first image is described. However, there may be a case where the first image has a higher degree of priority. When the first image has a higher degree of priority than the second image, the first image may be continued. Specifically, when the first image has a higher degree of priority, the projector 1 transmits a signal to continue updating the first image to the image supply device 2.

Another Example of Deciding Degree of Priority of Event Processing—2

There may also be a case where an event of a third image occurs, such as a warning indicating the occurrence of an abnormality in the image supply device 2 or a notification that the image supply device 2 has received predetermined information, in the state where the update of the first image such as a video based on a content image is stopped. The predetermined information may be, for example, a system indication generated in the image supply device 2 such as an OS update indication. In this case, the processing based on the third image waits until the processing based on the second image such as the menu screen M1 ends. Specifically, when an event of the third image occurs in the state where the update of the first image is stopped, the projector 1 temporarily disables the processing based on the third image and then performs the processing based on the third image after the processing based on the second image ends.

Embodiment 2

Example of Operation in Specified Event Processing

In this embodiment, an example of operation when a specified event involving both the projector 1 and the image supply device 2 occurs in the image display system 100 according to Embodiment 1 is described. As an example of the specified event, a case where the keystone correction button 64 on the remote controller 3 is pressed is described. As described above, the projector 1 is often used at home. In home use, various projection styles are employed. The projector 1 projects an image not only on a wall surface but also on a ceiling or the like. Therefore, it is assumed that keystone correction of a projection image is frequently needed.

Figure 6:
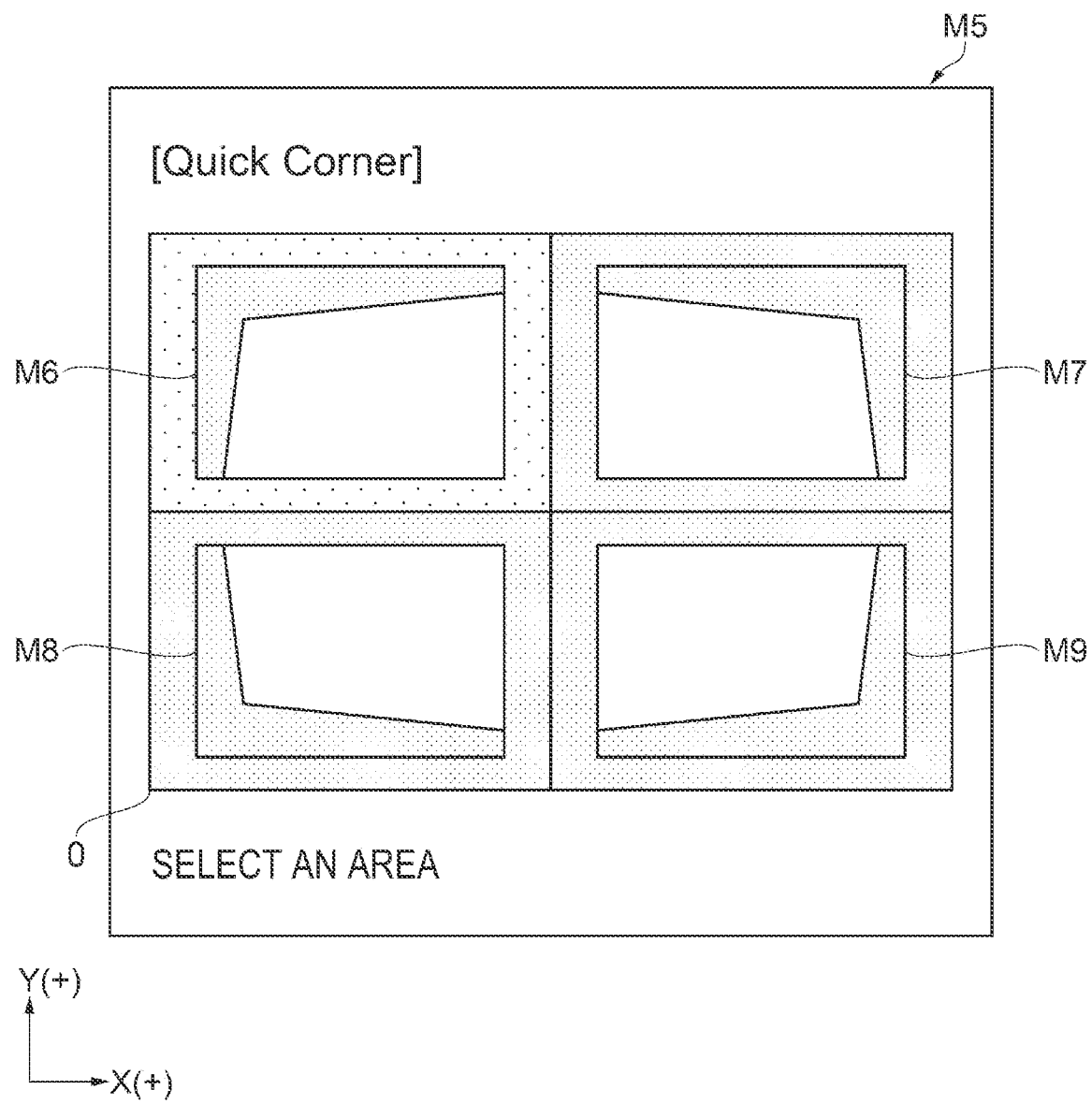
FIG. 6 shows a four-point keystone correction screen.

In this embodiment, as in Embodiment 1, the projector 1 in the initial state plays a video based on a content image from the image supply device 2. When the keystone correction button 64 on the remote controller 3 is operated as the specified processing in this state, the video is paused and a four-point keystone correction screen M5 shown in FIG. 6 is displayed in the video. The video is omitted from the illustration in FIG. 6. An operation flow after the keystone correction button 64 is operated will be described later.

As described above, keystone correction can be selected from the menu screen and the four-point keystone correction screen M5 shown in FIG. 6 can be selected, too. However, this way of selecting requires a plurality of operations and the user finds it troublesome. Specifically, the setting is selected from the item list on the left side in the menu screen M1 shown in FIG. 5. The setting screen includes selection items such as geometric distortion correction, two screens, and zoom. The geometric distortion correction is selected from among them. The geometric distortion correction screen includes selection items such as height and width, four-point keystone correction, and curvature correction. The four-point keystone correction needs to be selected from among them. Displaying the four-point keystone correction screen M5 shown in FIG. 6 takes a plurality of selections and decisions on three levels of selection screens all the way from the menu screen M1.

In contrast, in this embodiment, simply operating the keystone correction button 64 on the remote controller 3 directly causes the four-point keystone correction screen M5 shown in FIG. 6 to be displayed. The four-point keystone correction screen is also referred to as Quick Corner.

In the four-point keystone correction screen M5, the positions of the four corners in a projection screen can be individually adjusted. In the rectangle of the projection screen, the direction of the long sides is defined as an X (+) direction and the direction of the short side is defined as a Y (+) direction, based on an origin O at the bottom left corner as a reference point. The X (+) direction is also referred to as right. The X (−) direction is referred to as left. The Y (+) direction is referred to as up. The Y (−) direction is referred to as down.

As shown in FIG. 6, the default screen of the four-point keystone correction screen M5 shows the state where a correction screen M6 for the top left corner is selected. In this screen, a correction screen M7 for the top right corner, a correction screen M8 for the bottom left corner, and a correction screen M9 for the bottom right corner can be selected by operating the direction key 57. Then, pressing the enter button 58 with respect to the selected screen switches the screen to the selected correction screen. However, a plurality of operations with the direction key 57 and the enter button 58 are needed.

In contrast, in this embodiment, when the keystone correction button 64 on the remote controller 3 is operated as the specified processing, changing the functions allocated to the operation buttons on the remote controller 3 to different functions from the normal functions enables switching to a desired correction screen by a single operation. Specifically, a function F1 of selecting the correction screen M6 for the top left corner in the four-point keystone correction screen M5 shown in FIG. 6 is allocated to the menu button 59. Similarly, a function F3 of selecting the correction screen M7 for the top right corner is allocated to the source selection button 60. A function F7 of selecting the correction screen M8 for the bottom left corner is allocated to the rewind button 65. A function F9 of selecting the correction screen M9 for the bottom right corner is allocated to the fast-forward button 67.

Thus, pressing the source selection button 60 in the state where the four-point keystone correction screen M5 is displayed directly switches the screen to the correction screen M7 for the top right corner shown in FIG. 7A. In the correction screen M7 for the top right corner, the position of the top right corner can be adjusted upward, downward, and to left and right by the direction key 57 and then finalized by pressing the enter button 58. Subsequently, to adjust the position of the top left corner, pressing the menu button 59 in the state where the correction screen M7 for the top right corner is displayed directly switches the screen to the correction screen M6 for the top left corner, as indicated by an arrow in FIG. 7B. Similarly, the rewind button 65 can be pressed in order to switch to the correction screen M8 for the bottom left corner, and the fast-forward button 67 can be pressed in order to switch to the correction screen M9 for the bottom right corner.

Figure 8:
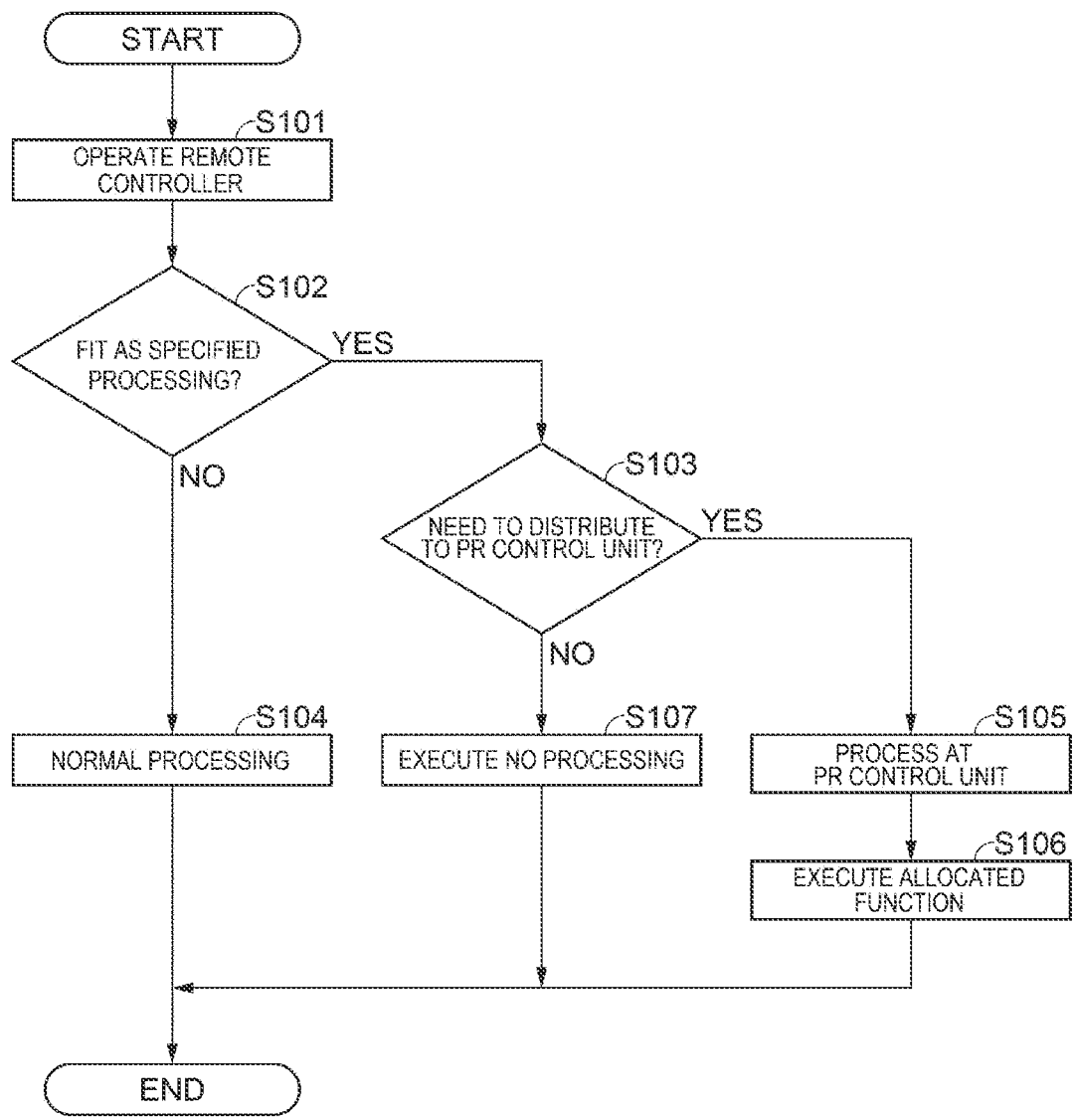
FIG. 8 is a flowchart showing a flow of processing of an allocated function in specified processing.

FIG. 8 is a flowchart showing a flow of processing of an allocated function in the specified processing. Here, a flow of processing of an allocated function in the remote controller 3, the image supply device 2, and the projector 1 is described.

In step S101, the keystone correction button 64 on the remote controller 3 is operated and an operation signal is transmitted to the image supply device 2.

In step S102, the image supply device 2 determines whether the received operation signal fits as the specified processing or not. When the received operation signal fits as the specified processing, the image supply device 2 goes to step S103. When the operation signal is based on the keystone correction button 64, this operation signal fits as the specified processing and therefore the image supply device 2 goes to step S103. When the received operation signal does not fit as the specified processing, the image supply device 2 goes to step S104. In step S104, the image supply device 2 performs normal processing corresponding to the received operation signal.

In step S103, the image supply device 2 determines whether the received operation signal needs to be distributed to the projector 1 or not. When the received operation signal needs to be distributed, the image supply device 2 goes to step S105. When the operation signal is based on the menu button 59, the source selection button 60, the rewind button 65 or the fast-forward button 67 having a different function from the normal function allocated thereto, the operation signal needs to be distributed and therefore the image supply device 2 goes to step S105. When the operation signal need not be distributed, the image supply device 2 goes to step S107. In step S107, no processing is executed.

In step S105, the projector 1 performs processing corresponding to the received operation signal. When the operation signal is based on the source selection button 60, the projector 1 executes the allocated function F3 to display the correction screen M7 for the top right corner. When the operation signal is based on the menu button 59, the rewind button 65 or the fast-forward button 67, the allocated function is similarly executed.

As described above, this embodiment has the following effects in addition to the effects in Embodiment 1.

When the keystone correction button 64 on the remote controller 3 is operated as the specified processing, the video is paused and the four-point keystone correction screen M5 shown in FIG. 6 is directly displayed in the video. Therefore, even when an event involving both the projector 1 and the image supply device 2 occurs, an appropriate operation is executed according to the operation signal. Also, higher operability and usability are achieved than when a plurality of operations on a plurality of selection screens from the menu screen are needed.

Also, changing the functions allocated to the operation buttons on the remote controller 3 to different functions from the normal functions in the state where the four-point keystone correction screen M5 is displayed enables execution of processing on the four-point keystone correction screen M5 as the second image. Thus, pressing the source selection button 60 in the state where the four-point keystone correction screen M5 is displayed can directly switch the screen to the correction screen M7 for the top right corner shown in FIG. 7A.

Therefore, the screen can be switched to a desired correction screen by a single operation, compared with when the direction key 57 and the enter button 58 are operated, requiring a plurality of operations.

Thus, the image display system 100 in which an appropriate operation can be executed according to an operation signal even when an event involving both the projector 1 and the image supply device 2 occurs, and which achieves high operability and usability, is provided.

Other Examples of Operation

In the above embodiments, it is assumed that the four-point keystone correction screen M5 shown in FIG. 6 is displayed when the keystone correction button 64 on the remote controller 3 is operated. However, instead of this screen, the correction screen M7 for the top right corner shown in FIG. 7A may be displayed. Also, the correction screens for the other corners may be displayed. As shown in FIG. 7A, in the correction screen M7 for the top right corner, an explanation text about corresponding keys for displaying the correction screens for the four corners is described. Therefore, referring to the explanation text, the user can have the correction screen displayed for the corner which the user wants to adjust.

In the above embodiments, the transmission-type liquid crystal light valves 22R, 22G, 22B are used as the light modulation devices. However, a reflection-type light modulation device such as a reflection-type liquid crystal light valve can be used. Also, a digital mirror device or the like which controls the direction of exit of incident light for each micromirror as a pixel and thus modulates the light emitted from the light source 21, can be used. Moreover, the configuration having a plurality of light modulation devices corresponding to respective colors is not limiting. A single light modulation device that modulates a plurality of color lights in time division may be employed.

In the above embodiments, the projector 1 is described as an example of an image display device. However, the image display device is not limited to the projector 1 and may be another image display device such as a liquid crystal display or organic EL (electroluminescence) display.

What is claimed is:

1. An image display system comprising:
    a display device;
    an image supply device coupled to the display device in such a way as to be able to bidirectionally communicate and supply an image signal; and
    an operation terminal having a plurality of operation buttons, wherein
    the operation terminal is configured to transmit an operation signal in response to an operation on the operation button, and
    the display device is configured to
    display a first image supplied from the image supply device and a second image generated by the display device, on receiving the operation signal, decide a degree of priority of the first image and the second image, and display the second image and transmit a signal to pause the first image and stop updating the first image to the image supply device and execute processing based on the second image when the degree of priority of the second image is higher than the degree of priority of the first image, wherein the first image is a video based on a content image from the image supply device, and wherein the second image is a menu screen to the image supply device.

2. The image display system according to claim 1, wherein the image supply device has a receiving unit configured to receive the operation signal from the operation terminal, the image supply device is configured to, on receiving the operation signal, transfer the operation signal to the display device according to a content of the operation signal, the display device is configured to transmit a response corresponding to the operation signal transferred from the image supply device, to the image supply device, and the image supply device is configured to execute processing represented by the response.

3. The image display system according to claim 2, wherein the display device is configured to transmit a signal to resume update of the first image to the image supply device when processing based on the second image ends in a state where the update of the first image is stopped.

4. The image display system according to claim 3, wherein when an event based on a third image occurs in the state where the update of the first image is stopped, the display device is configured to temporarily disable processing based on the third image, and perform the processing based on the third image after the processing based on the second image ends.

5. The image display system according to claim 1, wherein the display device is configured to transmit a signal to continue updating the first image to the image supply device when the degree of priority of the first image is higher.

6. The image display system according to claim 1, wherein when processing based on the second image is specified processing, a function allocated to the operation button is changed to a different function from a normal function, and the processing based on the second image is executed.

7. A control method for an image display system including a display device, an image supply device coupled to the display device in such a way as to be able to bidirectionally communicate and supply an image signal, and an operation terminal having a plurality of operation buttons, the control method comprising:

causing the operation terminal to transmit an operation signal in response to an operation on the operation button;

causing the display device to display a first image supplied from the image supply device and a second image generated by the display device;

causing the display device to decide a degree of priority of the first image and the second image when the display device receives the operation signal; and causing the display device to display the second image and transmit a signal to pause the first image and stop updating the first image to the image supply device, and to execute processing based on the second image, when the degree of priority of the second image is higher than the degree of priority of the first image.

* * * * *